D. M. DEARING.
RUNNING GEAR FOR MOTOR VEHICLES.
APPLICATION FILED JUNE 29, 1915.
1,178,060.
Patented Apr. 4, 1916.
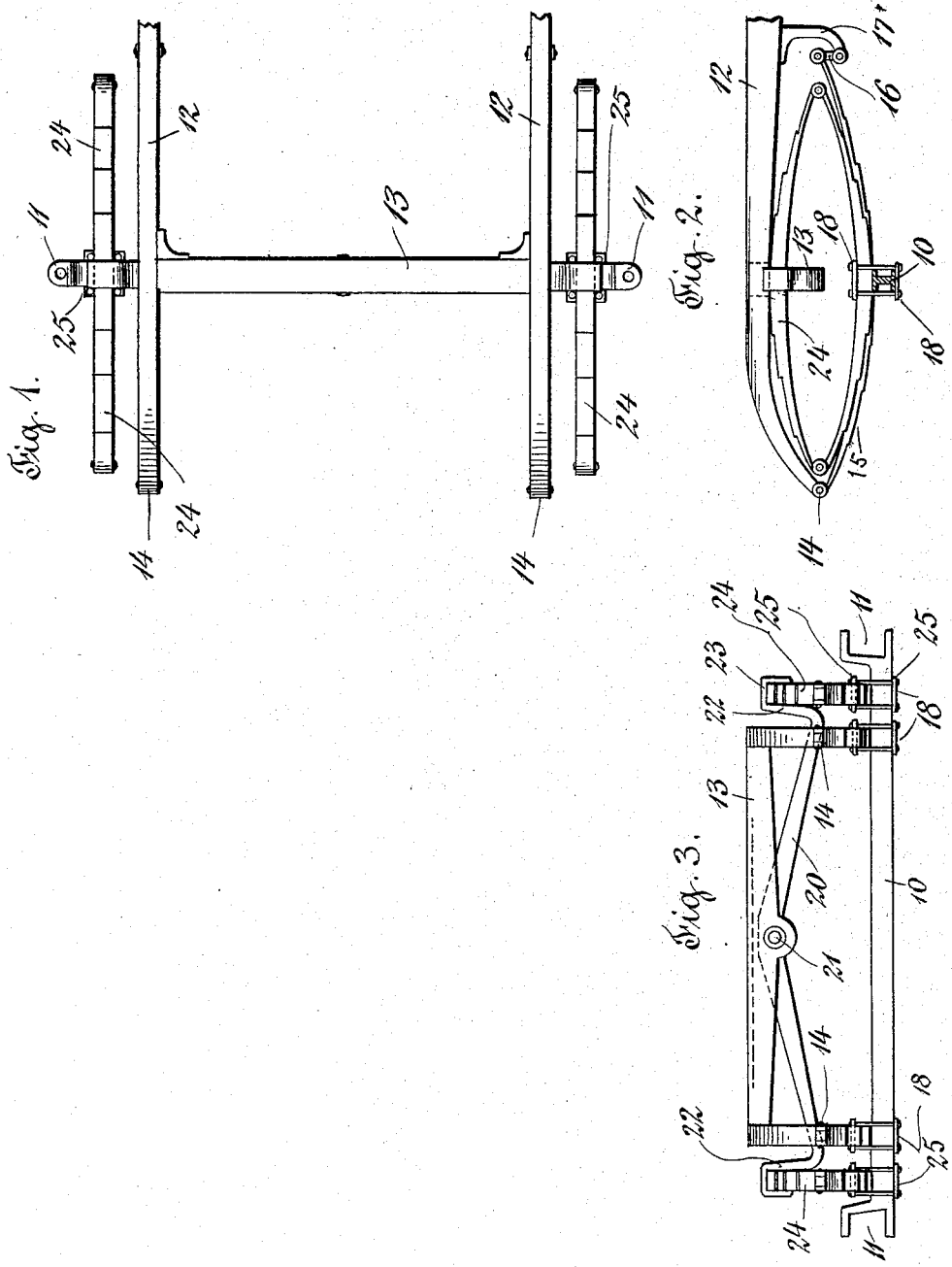
WITNESSES:
Albert A. Chamberlain
M. G. Fellows
INVENTOR.
David M. Dearing.

UNITED STATES PATENT OFFICE.

DAVID M. DEARING, OF JACKSON, MICHIGAN.

RUNNING-GEAR FOR MOTOR-VEHICLES.

1,178,060.   Specification of Letters Patent.   Patented Apr. 4, 1916.

Application filed June 29, 1915. Serial No. 37,121.

*To all whom it may concern:*

Be it known that I, DAVID M. DEARING, a citizen of the United States, residing at Jackson, in the county of Jackson and State of Michigan, have invented certain new and useful Improvements in Running-Gear for Motor-Vehicles, of which the following is a specification.

This invention relates to a running gear for motor vehicles, and more particularly to the means whereby the frame for the body is supported on the axles, most especially on the front axle.

The invention has for one of its objects the provision of an improved suspension comprising an equalizer which is used in conjunction with the axle, and in the combination therewith of members whereby the axle will be maintained in normal position, vertically, even during the up and down movement or sway of the body frame relatively thereto.

The invention has furthermore for its object the provision of improved means for supporting the equalizer on the axle, the entire organization being such that sudden drop of one end of the axle will normally not disturb the equilibrium of the frame, and, if such drop position should remain thus for any length of time, the deflection of the frame at that end will only be about one-half of the drop of the wheel.

Further objects of the invention will hereinafter appear and be particularly defined in the claims.

The invention has been clearly illustrated in the accompanying drawings, in which similar characters denote similar parts, and in which—

Figure 1 is a fractional top view of the body frame together with its supporting devices. Fig. 2 is a side view thereof, and Fig. 3 is a front view of the same.

The present invention has for its particular purpose the provision of certain improvements over the suspension devices for which U. S. Letters Patent were issued to me on May 21, 1912, No. 1,026,851 and on December 8, 1914, No. 1,120,036, to which reference may be had.

Referring to the present invention, 10 denotes the axle of the vehicle having the usual bifurcations 11 for receiving the steering knuckles of the front wheels. The chassis or frame comprises a pair of side members 12 which are connected by the bar 13 in any desired manner. The front end of each of the side members 12 extends beyond the bar 13 and is curved downward to provide a loop or eye 14 to which the front end of the semi-elliptic spring 15 is secured, this spring extending rearwardly and having its rear end supported by a shackle 16 and bracket 17, which latter is secured to the side member 12. Substantially near its central portion, the spring 15 is rigidly secured to the axle 10, as for instance by clips 18, so that consequently any vertical movement of the frame 12 will not tend to deflect the axle 10 out of its normal vertical position. Furthermore it will be noted that the frame will thus receive a direct support from the axle at those points, and also that the forward end of the spring 15 will act in the capacity of a pull rod which however permits perfect freedom for the axle to move vertically relatively to the frame. In addition to these frame supports, I provide, in combination with the cross bar 13, an equalizer or bolster 20 which may be rigid or flexible as desired and which is pivoted near its central portion, as for instance at 21 to the central part of the cross bar 13. The outer ends of the equalizer 20 drop away from the frame and are then provided with vertical risers 22 the upper ends of which are bent as at 23 to rest upon the uppermost leaves of a "full elliptic" spring 24 the lower half of which is also rigidly secured to the axle 10, as for instance by clips 25.

From the foregoing it will be understood that the front portion of the frame has three distinct supports directly connected with the axle, near the fulcrum point 21 of the equalizer 20 and its springs 24, and the pair of side springs 15 above mentioned, and it is in this point where the construction differs essentially from those shown and described in my former patents above referred to. By virtue of this construction it should be understood that the main or load carrying support of the frame consists of the equalizer 20 and its full elliptic springs 24, and that the side sway or teetering of the frame will be counteracted by the lighter springs 15, and furthermore that the lighter springs find a direct support on the axle 10 instead of on the equalizer as shown in my prior patents.

Changes may be made in the general organization as well as in the particular construction of some of the elements of my improved device without departing from the spirit of the invention, more especially in the construction of the springs whereby the support of the frame and the equalizer relatively to the axle is attained.

I claim:—

1. The combination with an axle, and a body frame, of a bolster pivoted to said frame and extending laterally thereof and longitudinally of said axle, springs for supporting said bolster ends from the axle, and semi-elliptic springs carried at their ends by said frame and having the intermediate portions rigidly secured to said axle.

2. The combination with an axle, and a body frame, of a bolster pivoted intermediate its ends on said frame and extending beyond the side members thereof, springs interposed between the ends of said bolster and the axle, and auxiliary springs interposed between the side members of said frame and axle.

3. The combination with an axle, and a body frame, of a bolster pivoted intermediate of its ends on said frame, elliptic springs for supporting the ends of said bolster on the axle, and half elliptic springs secured to the front ends of said frame and having a pivoted connection at the rear ends with said frame.

In testimony whereof I affix my signature in presence of two witnesses.

DAVID M. DEARING.

Witnesses:
B. E. LINABURY,
HOWARD LAKE.

Copies of this patent may be obtained for five cents each, by addressing the "Commissioner of Patents, Washington, D. C."